United States Patent [19]

McCullough

[11] 4,236,531
[45] Dec. 2, 1980

[54] ROTARY BLADE HOLDER

[76] Inventor: Timothy J. McCullough, Box 295, Lake Rd., Vermilion, Ohio 44089

[21] Appl. No.: 61,593

[22] Filed: Jul. 30, 1979

[51] Int. Cl.³ .................... A22C 17/12; B26B 15/00
[52] U.S. Cl. ................................................ 30/276
[58] Field of Search ............... 30/276, 301, 272, 316, 30/347, 43.5

[56] References Cited

U.S. PATENT DOCUMENTS

| | | | |
|---|---|---|---|
| 3,024,532 | 3/1962 | Bettcher | 30/276 |
| 3,176,397 | 4/1965 | Schuhmann | 30/347 |
| 3,269,010 | 8/1966 | Bettcher | 30/276 |
| 3,461,557 | 8/1969 | Behring | 30/276 |
| 3,852,882 | 12/1974 | Bettcher | 30/276 |

*Primary Examiner*—Othell M. Simpson
*Assistant Examiner*—Roscoe V. Parker

[57] ABSTRACT

An improved blade holder construction for rotatably mounting a circular-shaped meat-cutting blade on a handle having power drive means connected thereto. A metal ring is formed with an interior annular blade-receiving groove, and is split at one point on its periphery. A pair of axially extending, upstanding metal flanges are founded on opposite sides of the split integral with the ring. A pair of plastic mounting lugs are molded about the upstanding flanges and extend circumferentially along adjacent portions of the ring. A semicircular recess is formed in each of the lugs to provide a gear chamber for receiving a gear which drivingly engages the blade mounted in the ring groove. Arcuate portions of the plastic lugs are spaced axially from the top surface of the ring to form a pair of alignment grooves. A pair of oval-shaped holes are formed in the plastic lugs for adjustably mounting the holder on the handle.

9 Claims, 20 Drawing Figures

ROTARY BLADE HOLDER

BACKGROUND OF THE INVENTION

1. Field of the Invention

The invention relates to meat-cutting devices and particularly to a power-driven meat-cutting tool adapted to be manually held and manipulated for the quick and easy removal of meat from carcasses and bones. More particularly, the invention relates to a blade holder for rotatably mounting the blade on the handle and to a method of making the holder from a plastic injection-molded steel ring assembly.

2. Description of the Prior Art

Various styles of power-driven meat-cutting tools have been devised wherein a ring blade is rotatably mounted within a holder which, in turn, is mounted on a manually operated power-driven handle. These tools have been used for some time to facilitate the removal of meat from a carcass, primarily in a trimming operation, or for removing the meat remains from the animal bones. Examples of such meat-cutting tools are shown in U.S. Pat. Nos. 3,024,532, 3,176,397, 3,269,010, 3,461,557 and 3,852,882.

One of the preferred types of such meat-cutting tools is the type shown in U.S. Pat. No. 3,269,010. This tool consists of an annular metal ring having an internal blade mounting groove formed therein, with a pair of metal scalloped lugs being formed on opposite sides of a split in the ring and formed integrally with the metal of the ring. A gear-receiving chamber is formed in the scalloped lugs in addition to mounting holes for attaching the blade holder to an end of a power-driven handle.

These types of blade holders are formed entirely of metal and require a considerable number of machining and metal working operations to form the final configuration from a piece of tubular metal stock. FIG. 1 of the accompanying drawings illustrates an example of one of these prior art blade holders.

These holders require a considerable number of manufacturing steps and various types of metal working equipment. Initially, the tubular starting blank is placed in a turret lathe and an internal annular groove is formed in the blank in a relatively simple operation. Likewise, the outside diameter of the metal blade housing is turned in the blank while the blank is in this lathe. Next, the partially formed blade housing is cut off from its original tubular bar stock, having a predetermined axial length. Next, this removed tubular section is mounted in a milling machine wherein a circular recess is cut radially into a portion of the cylindrical wall to provide a gear chamber.

After formation of this gear chamber, the part is put into another turret lathe and an external annular alignment groove is formed in the outer surface of the blank for subsequent engagement with keys mounted on the power-driven handle. After this alignment groove is formed, two mounting holes are drilled radially through the cylindrical wall, one on each side of the gear chamber. The housing ring next is placed on a slotter which forms a relatively precise cut almost completely through the cylindrical wall and remaining metal portion which forms the back of the gear chamber, without completely separating the ring. At this stage, the part is still in a uniform axial cylindrical configuration, in that no scalloped mounting lugs or formation has been formed thereon.

The part then is sent through a heat treatment stage, after which it is placed in a grinder. The grinder removes a considerable amount of the stock away from the partially machined and heat-treated part, ending up with the particular ring-like configuration shown in FIG. 1, with a scalloped rear mounting portion. This grinding requires some degree of accuracy to form the scalloped mounting portion and remaining ring-like portion. This grinding step is generally the singular most expensive operation performed on the part and the most difficult to control due to the non-uniform shape finally resulting therefrom. This is especially difficult since the grinding has to be done after the heat treatment step. Also, the ring portion should be ground to as small an axial length as possible so that the blade can sufficiently remove meat from between bones and in as many narrow areas of the carcass as possible to get the most meat from the carcass. This is important both to the operator and ultimately to the customer.

This grinding procedure must be done after the heat treatment due to the non-uniform configuration of the final blade housing, which, if heat treated in this final non-uniform shape, would develop internal stresses which could distort the part sufficiently whereby the blade mounting groove would be out of roundness, preventing smooth running of the rotating blade therein.

After the grinding operation is complete, the remainder of the partially formed slot in the scalloped area and gear chamber then is ground completely through, permitting the ring to be separated and flexed for the subsequent mounting of a blade therein. Next, the split ring is either shot-peened with glass beads or other granular material or placed in a hopper in order to clean the ring and to remove sharp corners, edges and burrs therefrom. Some hand grinding also may be required to remove the sharp corners and burrs resulting from the extensive machining and grinding operations.

It is easily seen that the above-described operations and procedures, many of which may be done manually, increase considerably the cost of the final blade holder.

No blade holder construction of which I am aware has eliminated many of these costly metal working procedures by injection molding a pair of mounting lugs directly on a metal insert ring which has been preformed with the blade mounting groove therein.

SUMMARY OF THE INVENTION

Objectives of the invention include providing an improved blade holder construction having an annular metal ring for rotatably mounting an annular blade therein, which can be manufactured easily and inexpensively from tubular stock by usual metal working operations, in which most of the machining operations are completed prior to heat treating of the formed ring, and in which the ring is of a generally uniform, thin, cross-sectional configuration, thereby eliminating the heretofore expensive grinding procedures required in prior all-metal blade holder constructions; providing such an improved blade holder construction which is formed with a pair of upstanding flanges formed integrally with the annular metal ring which provide a foundation about which a pair of plastic mounting lugs are injection molded thereon, and in which holes are formed in the flanges to integrally bond the plastic about the flanges; providing such a blade holder construction in which the gear chamber, blade holder handle mounting holes and alignment grooves can be molded and formed in the blade holder in the same molding operation as the formation of the scalloped mounting lugs, thereby eliminating many of the separate manufacturing operations required in producing the all-metal blade holder construction; providing such a blade holder construction which requires a minimum amount of polishing and finishing for the removal of sharp edges, burrs and corners due to the elimination of the grinding operation heretofore required to form the scalloped mounting lugs and due to the covering of parts of the metal ring by the molded plastic, since the mold can be pre-polished to be free of sharp corners; providing such a blade holder construction which is able to be made considerably thinner than the heretofore all-metal constructions, since there is no distortion problem encountered during the injection forming of the scalloped mounting lugs as in the grinding process of forming the all-metal scalloped mounting lugs, since the grinding process is completely eliminated by the injection molding; providing such a blade holder construction which reduces considerably the amount of metal working equipment, procedures and manual operations heretofore required; and providing an improved blade holder construction which achieves the desired results with considerably less expense by saving in both labor and material costs during manufacture, which eliminates difficulties existing in the art, and which solves problems, satisfies needs and obtains new results.

These objectives and advantages are further obtained by the improved method of producing the improved blade holder construction described above, in which the formation of the blade-receiving groove, plastic lug-reinforcing flanges and outer diameter can be achieved during the single mounting of a tubular metal blank on a usual type of turret lathe; providing such an improved method in which a pair of scallop-shaped, upstanding mounting lugs are precision plastic injection molded on reinforcing flanges previously formed on the steel insert ring, and in which the gear-receiving recess, mounting holes and alignment grooves can be injection molded and formed generally simultaneously in the plastic mounting lugs during the molding thereof, eliminating the heretofore individual forming operations; and providing an improved manufacturing procedure in which the metal insert rings can be machined at remote sites and shipped in quantity to a different site for the subsequent injection molding of the plastic mounting lugs thereon.

These objectives and advantages are obtained by the improved blade holder construction, the general nature of which may be stated as including: an annular-shaped metal ring split at one point on its periphery; an interior, annular groove formed in the ring for rotatably mounting a complementary-shaped cutting blade therein; a pair of axially extending arcuate flanges formed integrally with the metal ring and located on opposite sides of the split; a pair of plastic arcuate-shaped lugs molded on the ring flanges and projecting upwardly from and circumferentially along a portion of the ring on both sides of the split; a semicircular recess formed in each of the plastic lugs in juxtaposition to each other to form a generally circular-shaped gear-receiving recess; a radially extending mounting hole formed in each of the lugs adapted to receive attachment screws therein; and a portion of the lugs being spaced above an arcuate portion of the ring on both sides of the split to form a pair of circumferentially extending arcuate alignment grooves.

These objectives and advantages are further obtained by the improved method of forming the blade holder construction, the general nature of which may be stated as including the steps of: providing a tubular metal blank having a cylindrical wall and a hollow bore; forming an interior annular blade-receiving groove in the wall of the tubular blank; removing an outer portion of the cylindrical wall to form upstanding arcuate flange means projecting axially from the blank; heat treating the blank after forming said blade-receiving groove and arcuate flange means; removing an arcuate section from the cylindrical wall and from the arcuate flange means to form a gap in the cylindrical wall and a pair of spaced flanges, each flange being located on opposite sides of said gap thereby forming a steel insert ring for the blade holder; molding a pair of upstanding mounting lugs on the spaced flanges and on adjacent portions of the cylindrical wall of the steel insert ring; forming a gear-receiving recess in the mounting lugs during the molding procedure; and forming a pair of spaced, radially extending, mounting holes in the mounting lugs for receiving a pair of screws to mount the formed blade holder on an operating handle.

BRIEF DESCRIPTION OF THE DRAWINGS

Further objectives and advantages of the invention will be hereinafter referred to and/or be apparent from the following description of the preferred embodiment of the improved blade holder and method of the invention, shown particularly in the accompanying drawings and set forth in the appended claims.

DESCRIPTION OF THE PREFERRED EMBODIMENT

Figure 1:
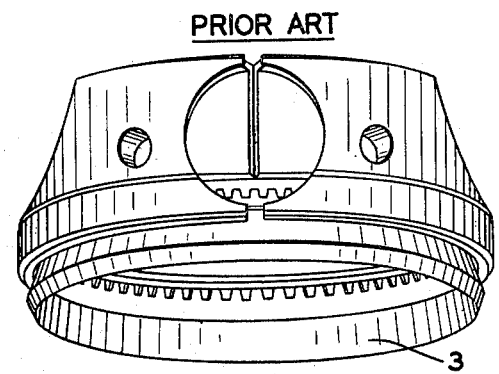
FIG. 1 is a perspective view of a prior art blade holder and blade assembly formed entirely of metal, of which the subject blade holder and method is an improvement thereon.
Figure 2:
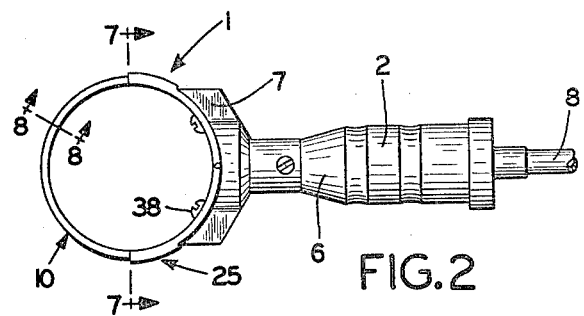
FIG. 2 is a top plan view of the improved blade holder and blade assembly mounted on a power-driven handle.

The improved blade holder construction is indicated generally at 1 and is shown mounted on a handle 2 (FIG. 2) having an annular cutting blade 3 rotatably mounted therein. Blade 3 is identical to the blade shown mounted on the prior art blade holder shown in FIG. 1. Handle 2 is of a usual known construction having a hollow stem portion 6 of a suitable size and shape to be conveniently grasped by an operator for movement of blade 3 across a meat carcass or bone.

An arcuate-shaped portion 7 is formed integrally with stem 6 at one end thereof and provides the support and attachment means for blade holder 1. An air line 8 is connected to the other end of stem 6 and is connected to a supply of air for driving an air motor (not shown) located within stem 6 adjacent arcuate mounting portion 7. Handle 2 may have other configurations and driving means without affecting the concept of the invention and forms no crucial part of the present invention.

Figure 3:
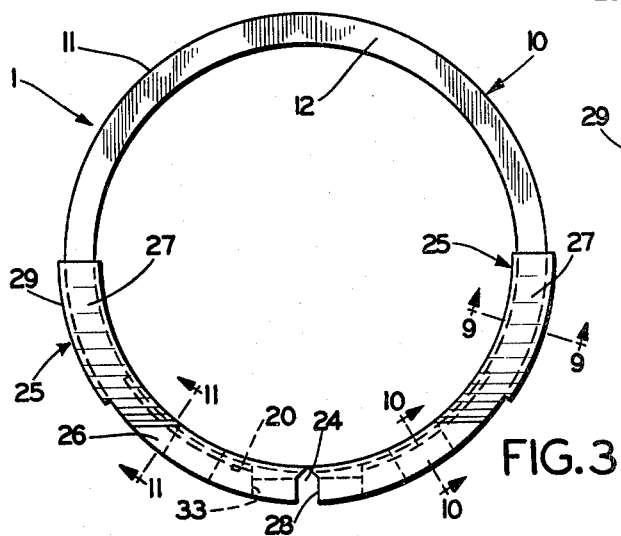
FIG. 3 is an enlarged top plan view of the improved blade holder construction of FIG. 2, with the blade removed therefrom.
Figure 4:
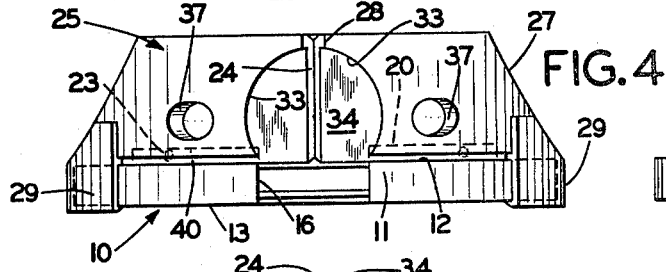
FIG. 4 is a rear elevational view of the improved blade holder construction shown in FIG. 3.
Figure 5:
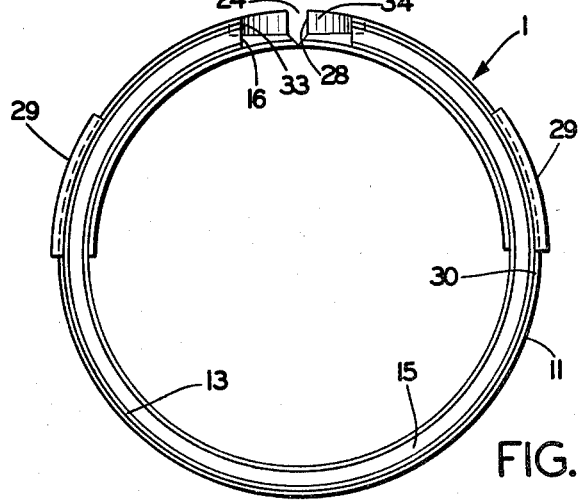
FIG. 5 is a bottom plan view of the improved blade holder construction shown in FIGS. 3 and 4.

Blade holder 1 includes an annular-shaped metal ring indicated generally at 10, formed by a cylindrical side wall 11 terminating in a radially in-turned top wall 12 and a concentric radially in-turned bottom wall or blade-supporting ledge 13 (FIGS. 3 and 5). Ring walls 11, 12, and 13 form an annular groove 15 for rotatably mounting cutting blade 3 therein. A slot or arucate-shaped gap 16 is formed at one point in the periphery of ring 10 (FIG. 4). Gap 16 preferably has an arcuate length of approximately 30°, although this can very, if desired.

Figure 7:
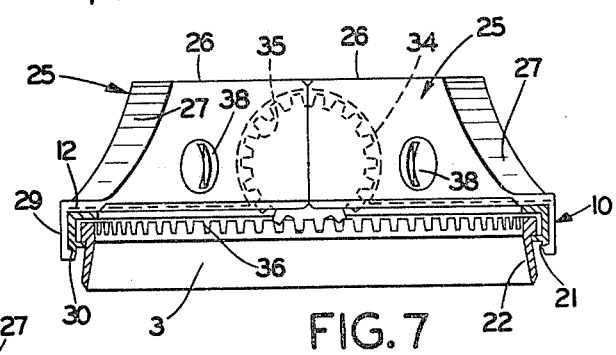
FIG. 7 is an enlarged sectional view of the improved blade holder and blade assembly taken on line 7—7, FIG. 2.
Figure 9:
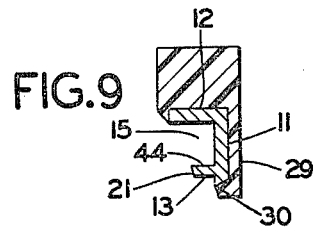
FIG. 9 is an enlarged sectional view taken on line 9—9, FIG. 3.
Figure 10:
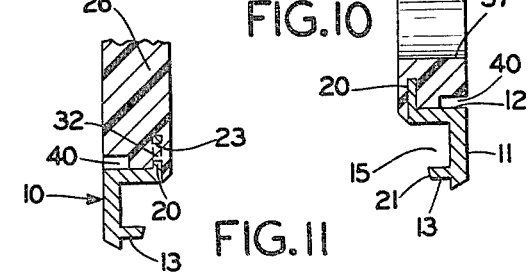
FIG. 10 is an enlarged sectional view taken on line 10—10, FIG. 3.
Figure 11:
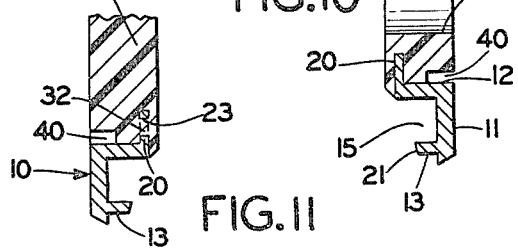
FIG. 11 is an enlarged sectional view taken on line 11—11, FIG. 3.
Figure 12:
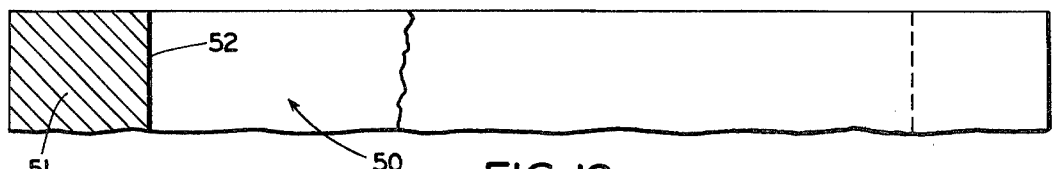
FIG. 12 is an enlarged fragmentary view, portions of which are broken away and in section, showing a portion of a piece of tubular stock of the type from which the steel insert blade-holding ring is formed by the improved method.
Figure 13:
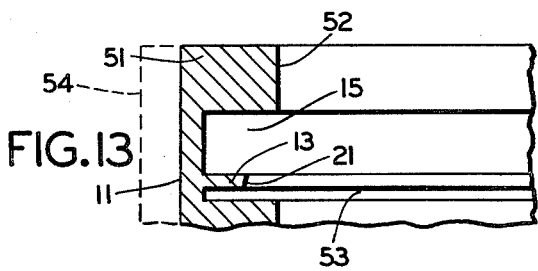
FIG. 13 is a fragmentary view of the tubular stock of FIG. 12 showing diagrammatically the partially formed blade holder after completing the steps of the invention in which the blade-holding groove and blade-supporting ledge is machined in the tubular stock and the outer diameter of the ring is final formed.
Figure 15:
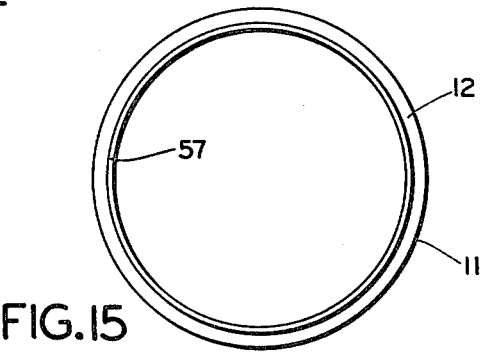
FIG. 15 is a top plan view of the partially formed blade holder insert ring shown in FIG. 14.

A pair of arcuate-shaped flanges 20 are formed integrally with and project axially upwardly from the inner edge of top wall 12 and are located adjacent gap 16 (FIGS. 4, 6, 10 and 11) and extend arcuately therefrom. Flanges 20 preferably have arcuate lengths of approximately 55°, although this dimension may vary without affecting the invention. A hole 23 is formed in each flange 20 to permit the flow of plastic therethrough, as described in detail below. The inner edge 21 of groove-forming ledge 13 is angled downwardly outwardly, as shown in FIGS. 9-11, in order to be complementary to the outwardly tapered slope of side wall 22 of blade 3 (FIG. 7).

Figure 6:
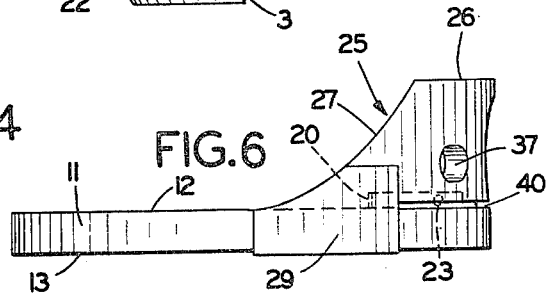
FIG. 6 is a left-hand side elevational view of the improved blade holder construction shown in FIGS. 3 and 4.

In accordance with the invention, a pair of injection molded plastic lugs generally indicated at 25, are formed on a portion of insert ring 10 adjacent gap 16. Lugs 25 provide the scallop-shaped mounting means for attaching the blade holder on handle 2. Lugs 25 are preferably identical to each other and are molded about flanges 20, which provide the internal reinforcement therefor, and enable lugs 25 to adhere strongly to insert rings 10. Lugs 25 have a generally arcuate shape, complementary to the inside curved surface of arcuate-shaped portion 7 of handle 2 and concentric with the diameter of top wall 12 of ring 10. Lugs 25 have flat top edges 26 which taper downwardly in smooth, somewhat concave, scalloped outer end edges 27, terminating in a somewhat smooth curve with top wall 12 of ring 10 (FIG. 6). The inner ends of lugs 25 are defined by vertically extending tapered edges 28 which abut and form a split 24 between the two lugs. Split 24 is located at the midpoint of ring gap 16, as seen in FIGS. 3-5.

A section 29 of the plastic material extends along the outer surface of ring wall 11 to further trap and bind ring 10 to the injection molded lugs 25. This plastic also may extend about the bottom edge 30 of side ring wall 11 to further entrap ring 10. Also, this plastic extends through holes 23 formed in flanges 20 to enable plastic plugs 32 to be integrally molded therein (FIG. 11) further binding lugs 25 to ring 10.

One type of material found suitable for forming lugs 25 is a polycarbonate material manufactured and sold by General Electric Company under its trademark LEXAN. Other types of plastic or synthetic materials possessing similar properties could be suitable for forming lugs 25, if desired.

Figure 8:
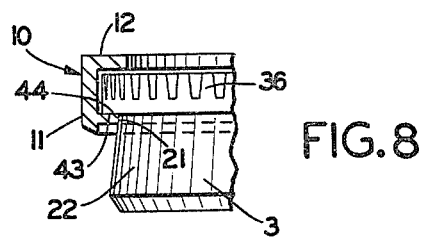
FIG. 8 is an enlarged fragmentary sectional view taken on line 8—8, FIG. 2.

A pair of generally semicircular recesses 33 (FIG. 4) are formed in lugs 25 adjacent slit 24 in juxtaposition to each other, forming a generally circular recess 34 which forms a gear chamber for a blade-driving gear 35 (FIG. 7). Gear 35 meshes with gear teeth 36 formed along the top edge of blade 3 for rotatably driving blade 3 in a usual manner (FIGS. 7 and 8). A pair of oval-shaped, radially extending mounting holes 37 are formed in lugs 25. A pair of screws 38 extend through holes 37 for mounting blade holder 1 on handle 2 in a usual manner.

A pair of arcuate grooves 40 are formed between top wall 12 of ring 10 and the bottom of lugs 25 (FIGS. 4, 6 and 11) and extend between recessess 33 and plastic section 29. Grooves 40 provide the alignment means for the blade holder into which arcuate-shaped alignment pins (not shown), which extend along the inner surface of the handle portion, project when mounting holder 1 on handle 2.

Blade 3 is removably and rotatably mounted on improved holder 1 in a usual manner. An inwardly extending annular shoulder 43 is formed between gear teeth 36 and blade wall 22 (FIG. 8) and is slidably mounted on and supported by top surface 44 of ring ledge 13.

In accordance with another aspect of the invention, the improved blade holder construction 1, described above and illustrated particularly in FIGS. 2-11, is formed by an improved and novel method, shown diagrammatically in FIGS. 12-20 and described below.

In carrying out the steps of the invention, a section of tubular stock, indicated generally at 50 (FIG. 12), formed by cylindrical wall 51 and having an internal bore 52, is mounted in a turret lathe or similar metal working equipment. Preferably, the outer diameter of wall 51 is greater than the final diameter of insert ring 10 to be produced therefrom, as shown by a comparison of FIGS. 12 and 13.

Blade mounting groove 15 is formed in cylindrical wall 51 within bore 52, with a diameter complementary to the outer diameter of the gear teeth portion 36 of blade 3. Groove-forming ledge 13 also is formed during the machining of groove 15, as well as its angled edge 21 by machining a secondary annular groove 53 (FIG. 13) beneath ledge 13. After the steps of forming grooves 15 and 53 and angled ledge 13, the outer diameter of tube wall 51 is reduced to the predetermined outer diameter of ring 10, by removing an outer cylindrical portion of wall 51 shown by dotted lines 54 in FIG. 13. This metal removal also forms the cylindrical side wall 11 of ring 10.

Figure 14:
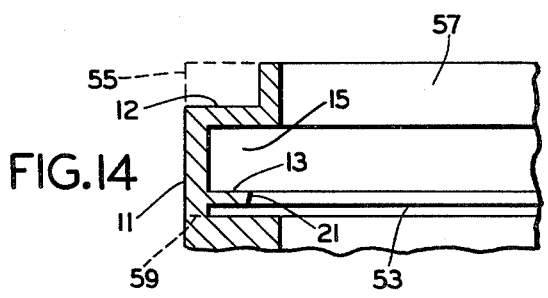
FIG. 14 is a diagrammatic view similar to FIG. 13, showing the next steps of the improved method in which an annular top flange is formed on the top wall of the blade-mounting groove, and the final angle and size is imparted to blade-supporting ledge.

Next, an annular portion of metal represented by the area within dotted lines 55 of FIG. 14 is removed from the remaining upper portion of cylindrical wall 51. This step forms top wall 12 of groove 15, and an inner, annular-shaped, upstanding, axially extending flange 57 (FIGS. 14 and 15) concentric with cylindrical side wall 11.

Figure 17:
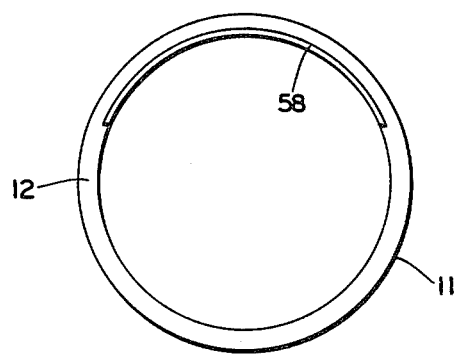
FIG. 17 is a top plan view of the partially formed blade holder insert ring of FIG. 16.
Figure 16:
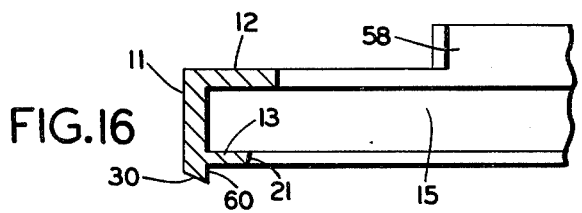
FIG. 16 is a diagrammatic view similar to FIGS. 13 and 14 showing the further steps of the improved method in which the annular top flange is milled to form an arcuate flange segment and the final axial length of the blade holder is final formed.

The next step of the improved method is shown in FIGS. 16 and 17 wherein a majority portion of arcuate flange 57 is removed by milling or other metal working procedure. This operation leaves an arcuate flange section 58 of approximately 135° arcuate length remaining on groove top wall 12. Next, the partially formed ring then is cut from tube stock 50 along dotted line 59 in FIG. 14 leaving an annular rib 60 extending downwardly from ledge 13 which forms bottom edge 30 of ring wall 11.

Figure 18:
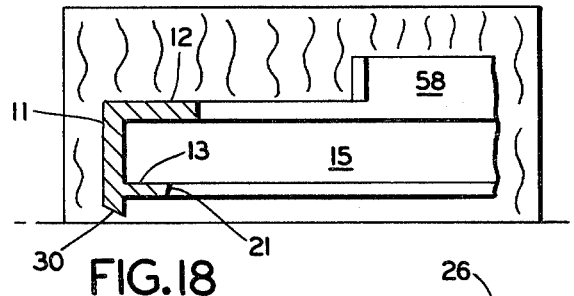
FIG. 18 shows the heat treatment step of the improved method being performed on the partially formed blade holder insert ring of FIGS. 16 and 17.

The blank stage ring of FIGS. 16 and 17 then is removed from the lathe and heat treated by known heat treating procedures, as shown diagrammatically in FIG. 18. The uniform thicknesses and symmetrical configuration of the stage blank ring have a very small distortion factor due to this uniform thickness and configuration, which is relatively thin in contrast to the prior art all-metal baled holder construction described above. Furthermore, this heat treatment can be done easily by an induction heat system which can uniformly and quickly heat the intermediate stage blank ring. Also, the heat treated ring can be quenched and cooled very rapidly, since the amount of distortion is minor, which is not possible in the prior art method.

Figure 19:
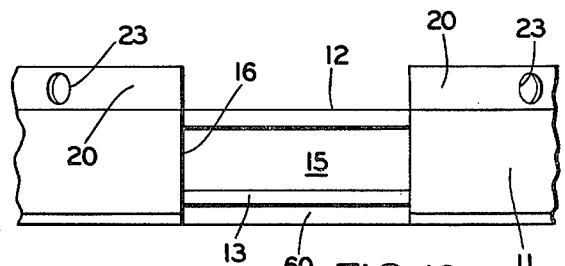
FIG. 19 is an enlarged elevational view showing the method step of forming a gap in the ring portion and annular top flange of the nearly completed insert ring of FIGS. 16-17.

After the heat treatment step of FIG. 18, gap 16 is formed in the ring groove-forming walls 11, 12 and 13 and in arcuate flange 58 by removing an arcuate section thereof, as shown in FIG. 19. This metal removal forms spaced arcuate flanges 20 on both sides of gap 16. Holes 23 also are drilled in flanges 20 during this gap-forming operation.

The ring then can be cleaned by putting it in a tumbler and allowing it to tumble with a polishing media such as glass beads or sand. After removal from the tumbler, the completed insert ring 10 then is placed in a usual injection molding machine and, in accordance with one of the main features of the invention, is provided with the plastic injection molding mounting lugs 25. During the step of mold forming lugs 25, gear chamber 34, mounting holes 37, and alignment grooves 40 are formed simultaneously, thereby eliminating the additional individual procedures heretofore required for providing the same. Alignment grooves 40 are formed above top ring wall 12 and extend arcuately between the edges of gap 16 and plastic section 29.

Split 24 also is formed during the molding of lugs 25 eliminating the additional slitting step required in the prior all-metal blade holder construction. Likewise, the edges 28 of split 24 can be tapered, if desired, during the molding step.

Figure 20:
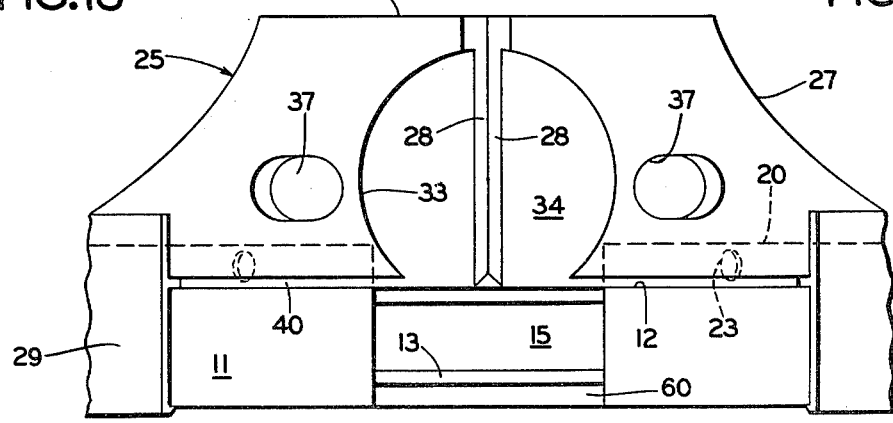
FIG. 20 is an enlarged, fragmentary, elevational view showing the scallop-shaped plastic mounting lugs integrally molded on the metal insert ring produced by the method steps of FIGS. 12-19.

Mounting holes 37 preferably have an oval shape, as shown in FIGS. 4 and 20, to enable a slight amount of adjustment to be made when mounting the improved blade holder on handle 2 by screws 38 to compensate for any small out-of-roundness which may be present in ring 10 and mounting lugs 25.

Blade 3 is easily mounted in holder 1 by slightly spreading apart split 24, as in the all-metal holder, and inserting blade 3 therein with blade shoulder 43 slidably resting on top surface 44 of groove ledge 13.

This improved method enables nearly all the metal working operations to be accomplished on a usual turret lathe in one setup. The internal grooves 15 and 53 are turned in tubular blank bore 52 together with the final outside diameter sizing. Also, the forming of the various angles on ledge edge 21 and on side wall bottom edge 30 can be done on this lathe. Likewise, annular flange 57 is formed on top wall 12. Furthermore, arcuate flange 57 is formed on top ring wall 12 during another lathe operation. All of these lathe operations are performed prior to the heat treatment step shown in FIG. 18.

Only the formation of gap 16 and flange holes 23 are done after the heat treatment of the metal ring in contrast to the complicated and elaborate grinding operation on the all-metal holder.

Heat treatment of the nearly completed insert ring 10 can be accomplished quickly due to the uniform configuration of the metal ring, since very little distortion will occur.

The improved blade holder construction and method of forming the same has a number of advantages, the main one of which is the reduction of the number of metal working operations that must be performed in forming metal insert ring 10 by eliminating the integral scalloped mounting lugs required in the prior all-metal blade holders which had to be ground to final form after the metal had been heat treated. Another advantage is the simultaneous formation of the gear-receiving chamber, mounting holes and alignment grooves in the plastic mounting lugs during the mold forming operation. Another advantage is the relatively thin, uniform, cross-sectional configuration of the insert ring when it is heat treated, thereby reducing uneven stresses in the metal, resulting in out-of-roundness to the ring mounting groove. The main feature and advantage of the improved blade holder and of the method of producing the same is the considerable reduction in manufacturing and material cost for producing the blade holder.

As will be apparent to those skilled in the art to which the invention relates, the above-described invention should not be limited to the particular construction and method steps shown and described, but may be modified, and it is the intention to hereby cover all adaptations, modifications and uses thereof which come within the practice of those skilled in the art to which the invention relates, and should not be so limited but include those changes and modifications coming within the terms of the claims set forth below.

I claim:
1. A blade holder construction for a meat-cutting tool including:
   (a) an annular-shaped metal ring split at one point on its periphery;
   (b) an interior, annular groove formed in the ring for rotatably mounting a complementary shaped cutting blade therein;
   (c) a pair of axially extending arcuate flanges formed integrally with the metal ring and located on opposite sides of the split;
   (d) a pair of plastic arcuate-shaped lugs molded on the ring flanges and projecting upwardly from and circumferentially along a portion of the ring on both sides of the split for attaching the blade holder to a power-driven handle;
   (e) a semicircular recess formed in each of the plastic lugs in juxtaposition to each other to form a generally circular-shaped gear-receiving recess; and
   (f) a radially extending mounting hole formed in each of the lugs adapted to receive attachment screws therein.

2. The blade holder construction defined in claim 1 in which the mounting holes have an oval shape to provide for adjustment mounting of the holder on a power-drive handle.

3. The blade holder construction defined in claim 1 in which the arcuate ring flanges each extend throughout an arcuate length of approximately 55°.

4. The blade holder construction defined in claim 1 in which opening means are formed in each of the arcuate ring flanges; and in which a slug of plastic extends through said flange opening means and is formed integrally with the plastic mounting lugs.

5. The blade holder construction defined in claim 1 in which the ring includes an integrally connected annular-shaped top wall, a cylindrical-shaped side wall and an annular-shaped, radially inwardly extending ledge spaced from said top wall, with said walls and ledge forming the blade mounting groove therebetween.

6. The blade holder construction defined in claim 5 in which the ledge terminates in an outwardly downwardly extending edge.

7. The blade holder construction defined in claim 5 in which the cylindrical-shaped side wall terminates in a bottom edge which extends below the ledge; and in which the plastic lugs include portions extending along the cylindrical side wall and beneath the bottom edge thereof.

8. The blade holder construction defined in claim 1 in which the plastic lugs are formed of a polycarbonate material.

9. The blade holder construction defined in claim 1 in which a portion of the lug is spaced above an arcuate portion of the ring on both sides of the split to form a pair of circumferentially extending arcuate alignment grooves.

* * * * *